Sept. 20, 1932.   M. M. STEFFENSEN   1,878,015
FISH LURE
Filed Feb. 11, 1931
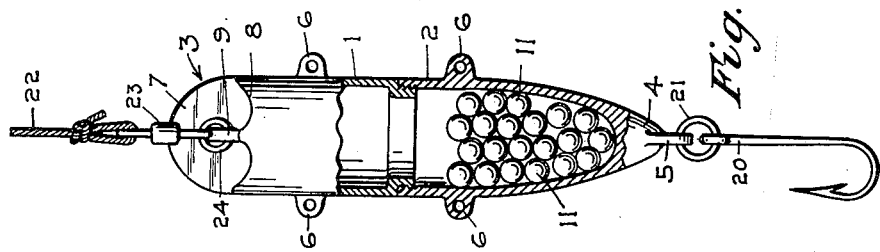
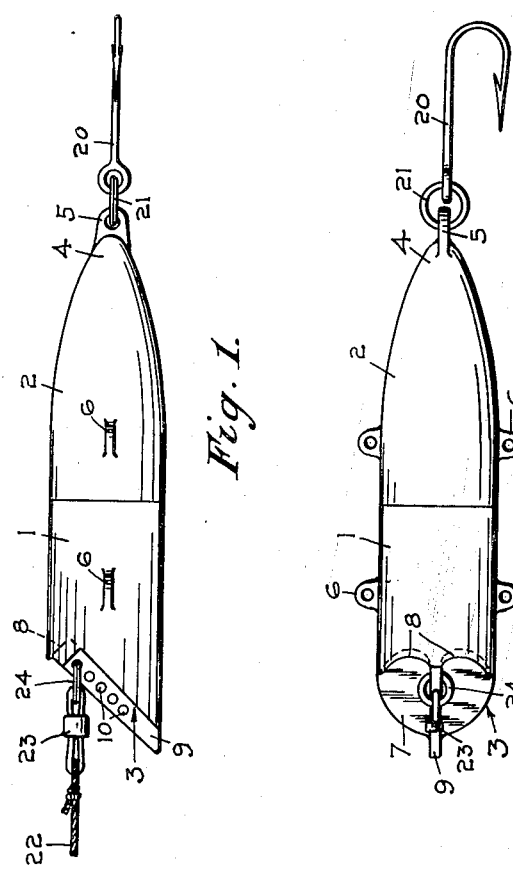
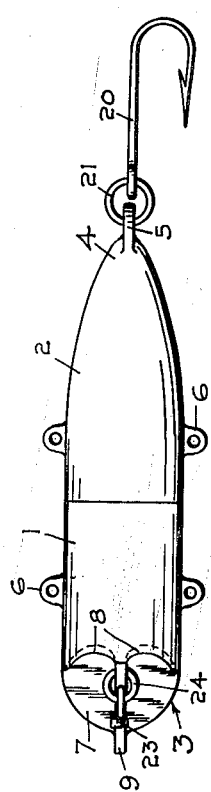
INVENTOR
Marius M. Steffensen
BY J. R. Rivers,
ATTORNEY Patented Sept. 20, 1932

1,878,015

UNITED STATES PATENT OFFICE

MARIUS M. STEFFENSEN, OF SEATTLE, WASHINGTON

FISH LURE

Application filed February 11, 1931. Serial No. 514,970.

This invention relates to improvements in fish lures, and it is a device serviceable either in trolling or jigging for fish.

Its objects, generally stated, are, to provide a device of this character possessing buoyancy and a form adapting it to trolling, and which in connection with its appearance and movements will make it attractive to fish which bite near the surface of the water; and, to afford in such a lure instrumentalities for increasing its weight without changing its appearance, whereby it may be utilized as a fish jigger to render it attractive and accessible to what are termed bottom fish or those which bite at lower depths.

In the accompanying drawing—

Figure 1 is a side elevation of the device carrying a single fish hook and a line, said line being broken away; the device now being shown in approximately the position it assumes in trolling.

Fig. 2 is a top view of the same.

Fig. 3 is a vertical section of said device, including said hook and line, it now being weighted so as to permit the device to assume a vertical position in the water and to serve as a jigger, the body portion being partly broken away.

Referring more particularly to the drawing, the device comprises a forward portion 1, circular in cross section throughout the major part of its length, which is complementary to and threadedly engageable with a rear portion 2, also circular in cross section. Said portions provide a hollow and watertight structure simulating the body of a fish having a head, generally denoted as 3, and a tail 4. An eye 5, extending from the tail, serves as a support for a fish hook, and a plurality of eyes 6, extending laterally from each side of the body, are designed to indicate fins, and also carry fish hooks, if desired.

Said head is provided with a face having a portion 7 disposed on an inclined plane and terminating upwardly in a pair of inwardly curved sections 8, said sections being located angularly relative to the portion 7, as indicated in Fig. 1. A centrally located rib 9 disposed on said portion and between said sections is provided with a plurality of openings 10 and is adapted to adjustably support a fish line.

The portion 7 and sections 8 are so formed and arranged as to afford such resistance to the water as the device is drawn therethrough which will impart lateral movements to the device to imitate in a way the natural movements of a fish when swimming, and while the rib 9 is primarily designed as a fish line support, it, as is evident, serves also to guide and facilitate the movement of the device through the water.

The device is designed to be of metallic construction, and while I do not wish to be limited to any particular metallic material, I have found aluminum on account of its lightness and attractive appearance to be highly desirable, however, brass properly nickeled, or other suitable material may well be utilized. It is not contemplated that the device, constructed as described, shall be light enough to float, however, it should be sufficiently buoyant to skim through the water and function in the manner requisite for a lure in trolling.

To add weight to the device for the purpose heretofore referred to, a quantity of shot 11 is placed within the portion 2, as indicated in Fig. 3, so as to cause the lure to assume an upstanding position when submerged in water.

In equipping the device for use in the manner illustrated, a hook 20 is secured by the ring 21 to the eye 5, and a line 22 is secured by the link 23 and ring 24 to one of the openings 10. The position of the device relative to said line may be varied, the same being determined by the location of the line in the rib 9, and the plurality of said openings provided permit an adjustment of the line thereto which will best meet the desires of the user.

It is apparent from the foregoing, the device may be operated for trolling in the manner usually employed for devices of its class, and when it is weighted as described it will then function so that the jerky reciprocating movement required in fish jigging may be imparted to it.

Changes in and modifications of the construction described may be made without departing from the spirit of my invention or sacrificing its advantages, hence it is asked that I be not confined to the specific structure set forth, except as limited by the appended claims.

I claim:

1. A fish lure of metallic construction, comprising a forward portion, a rear portion, said portions being detachably connected together and defining a hollow water-tight body member, a head extending from said member and provided with a flat face disposed on an inclined plane and surmounted by a pair of inwardly curved sections located angularly relative to said face, an integral and apertured rib disposed on said face and between said sections, an apertured fin extending from each side of said member, and a tail portion extending from said member and terminating in a support for a fish hook.

2. In a fish lure having a body member, a head for said member provided with a flat face disposed on an inclined plane and surmounted by a pair of inwardly curved sections located angularly relative to said face, said sections serving in cooperation with said face, to impart fish-like movements to said lure when it is propelled through water.

3. In a fish lure, an elongated hollow body member of metallic construction, and a head for said member, comprising an upwardly inclined face having a plane surface, said face being surmounted by an integral projecting fore piece connecting said face angularly and providing a water-resistance element to impart lateral movements to said body member when the head is impelled forwardly.

4. A fish lure of metallic construction, comprising a forward portion, a rear portion complementary to said forward portion and defining in cooperation therewith a body member simulating the body of a fish, a watertight connection for detachably securing said portions together, a head extending from said forward portion and provided with an upwardly inclined face having a plane surface, said face being surmounted by an integral projecting fore piece connecting said face angularly and providing a water-resistance element, an apertured fish line support connected with said head, and a tail extending from said rear portion and carrying a support for a fish hook, said rear portion being hollowed and serving, in cooperation with said forward portion, to enclose a removable weight of a character to permit said lure to serve as a fish jigger.

MARIUS M. STEFFENSEN.